Aug. 5, 1969　　T. A. HUNTER ET AL　　3,459,269
FRUIT HARVESTER
Filed May 25, 1967　　2 Sheets-Sheet 2
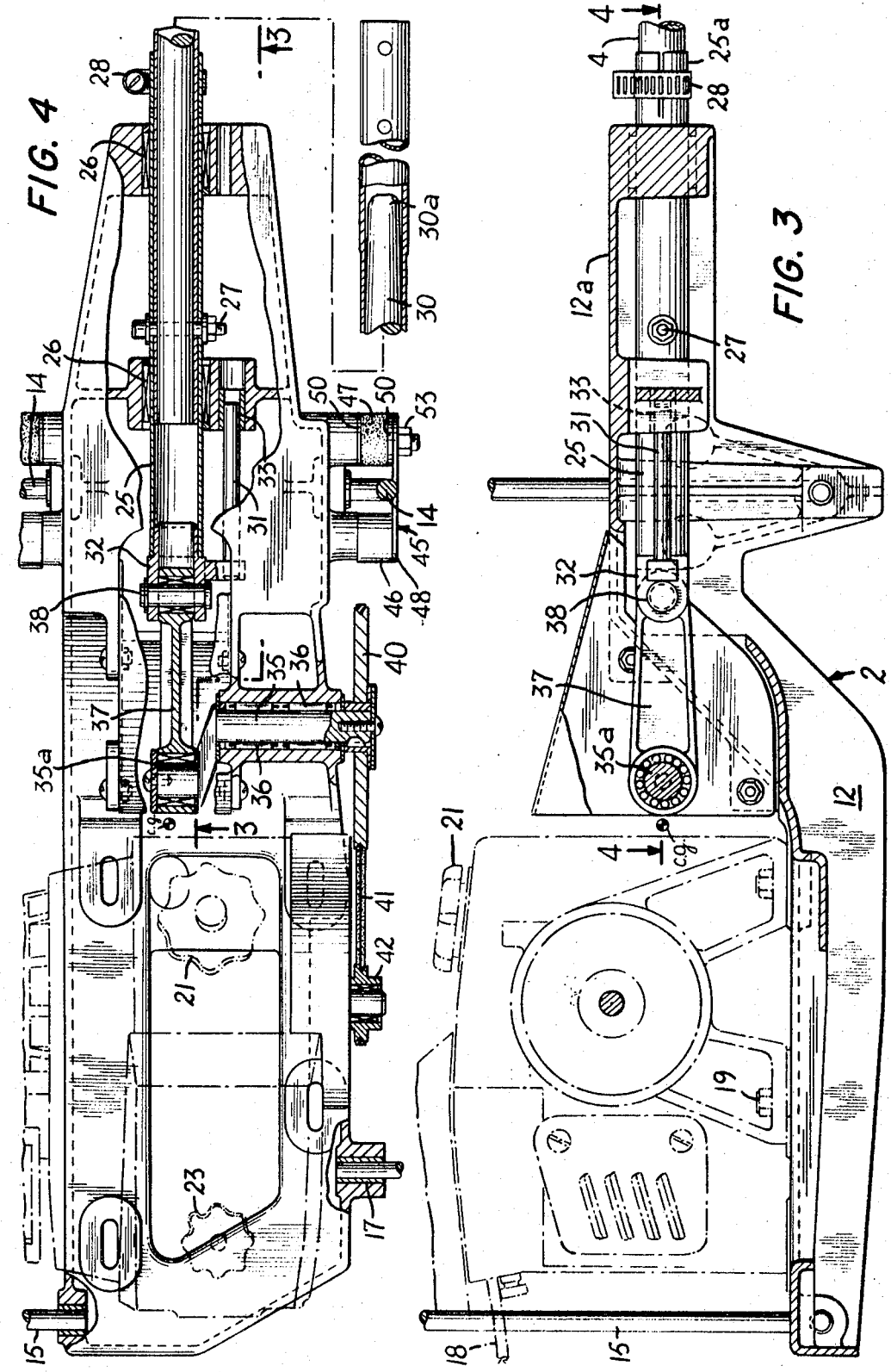

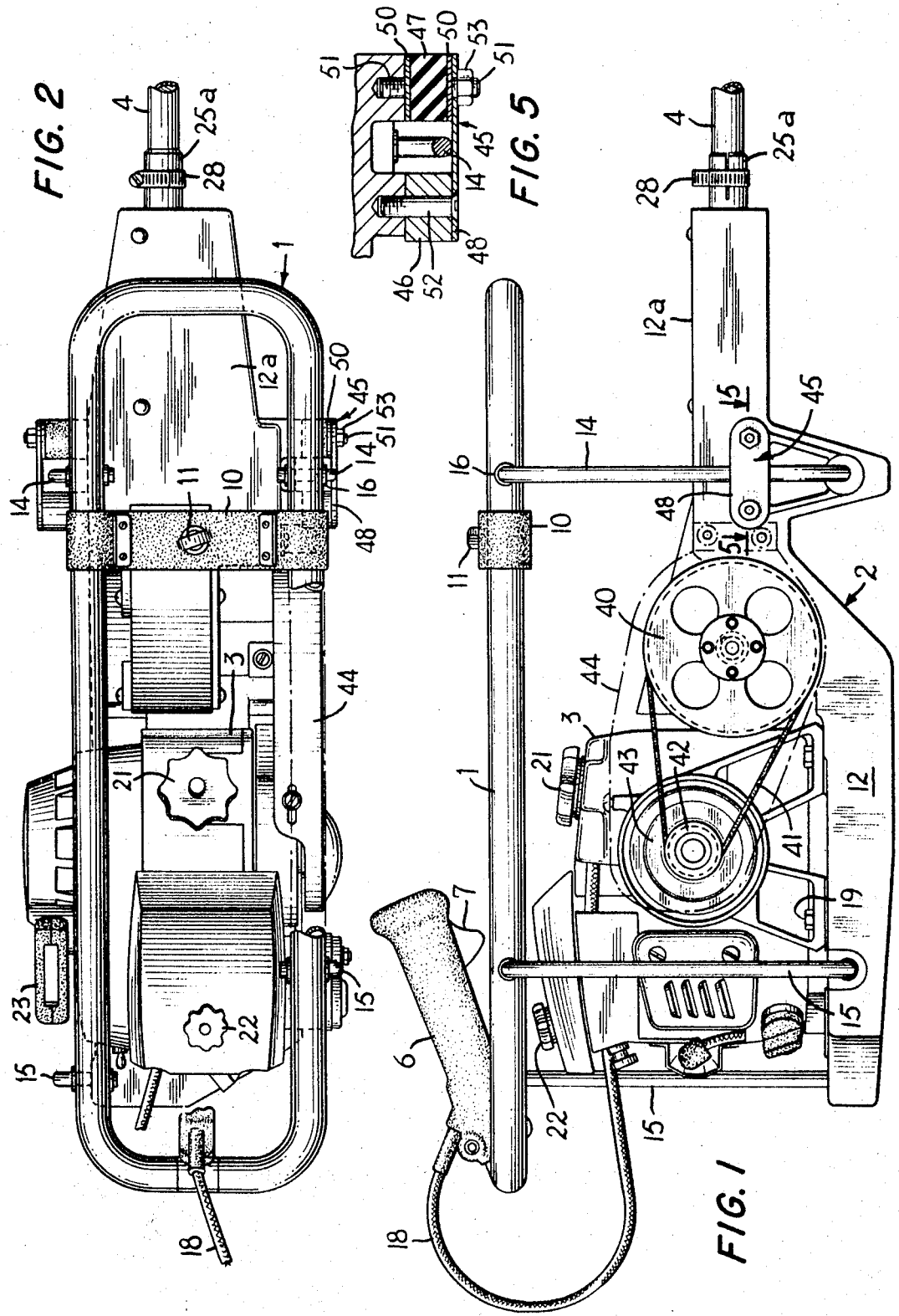

United States Patent Office 3,459,269
Patented Aug. 5, 1969

3,459,269
FRUIT HARVESTER
Thomas A. Hunter, Westport, Noble P. Sherwood, Greenwich, and Gilbert E. Buske, Stamford, Conn., and Alexander J. Guarino, Tuckahoe, N.Y., assignors to Textron, Inc., Providence, R.I., a corporation of Rhode Island
Filed May 25, 1967, Ser. No. 641,331
Int. Cl. B23b 45/04; A01g 19/00
U.S. Cl. 173—170                                    11 Claims

ABSTRACT OF THE DISCLOSURE

Apparatus for harvesting fruit by shaking a tree or limb comprises a hand held support preferably in the form of a rectangular tubular frame and a power unit suspended from the support by a parallelogram linkage permitting oscillation of the power unit relative to the support. A boom extending from the power unit and having at its upper end a connection for attachment to the limb of a tree, is mounted for generally lengthwise oscillation. The power unit comprises a motor and driving connections between the motor and the boom to oscillate the boom relative to the power unit. Reaction forces cause the power unit to oscillate relative to the support. The boom is positioned so that its longitudinal axis passes substantially through the center of gravity of the power unit so that the reaction forces of the boom and power unit are substantially in line with one another. A speed control for the motor is provided on the hand-held support and is connected to the motor by a flexible connection. A sliding torque arm restrains rotary movement of the boom.

---

The invention relates to fruit harvesters of the kind that shake the tree, tree branch or vine to dislodge the fruit. For convenience, the term tree limb is herein used in a generic sense to designate what is being shaken.

Tree shaking apparatus may be divided into two categories, namely (1) apparatus mounted on a tractor, truck, trailer or other vehicle and (2) apparatus that is hand-held by an operator. While some features of the invention are applicable to both categories, the invention is of particular significance with respect to hand-held apparatus.

Tree shaking apparatus generally consists of a power unit and a boom which extends from the power unit to the limb of a tree and is reciprocated by the power unit to shake the limb. A problem arises from the fact that the reaction of forces applied to shake the tree limb also shakes the driving unit. In vehicle mounted apparatus, the vehicle structure can be designed to withstand these reaction forces. However, in hand-held apparatus, reaction forces are transmitted to the operator and make the unit difficult to hold. Even if an operator is strong enough to hold the unit against the reaction forces, he soon becomes fatigued. Moreover, if the apparatus is of sufficiently light construction to be hand held, it has not been found possible heretofore to make it sufficiently rugged to withstand the continued shaking to which it is subjected. Hence, the useful life of such apparatus has been quite short.

It is an objective of the present invention to provide improved tree shaking apparatus in which the difficulties previously experienced are overcome. In accordance with the invention, the power unit is suspended from a support so that oscillation of the power unit produced by reaction forces is not substantially transmitted to the support. Hence, in hand-held apparatus, the operator holding the support is not subjected to objectionable vibration or other oscillatory forces. The generation of objectionable secondary forces is avoided by arranging the boom so that its longitudinal axis passes substantially through the center of gravity of the power unit. The forces applied to reciprocate the boom and the tree limb to which it is attached and the resulting reaction forces on the power unit substantially balance out and hence, substantially are not transmitted to the supporting handle held by the operator. Moreover, it has been found with the arrangement in accordance with the invention, it is possible to achieve durability while making the unit of sufficiently light construction to be held without difficulty by an operator.

Further objects and advantages of apparatus in accordance with the invention will appear from the following description of a preferred embodiment of the invention shown in the accompanied drawings in which:

FIG. 1 is a side elevation of the apparatus with a portion illustrated in phantom in order to show underlying structure.

FIG. 2 is a plan with portions broken away.

FIG. 3 is a vertical section taken approximately on the line 3—3 in FIG. 4 with the engine shown in broken lines.

FIG. 4 is a horizontal section taken approximately on the line 4—4 in FIG. 3 and with the engine shown partially in broken lines.

FIG. 5 is a fragmentary section taken approximately on the line 5—5 in FIG. 1.

Apparatus in accordance with the invention shown by way of example in the drawings comprises a handle or support 1, a power unit 2 including a motor 3 suspended from the support so as to oscillate relative to the support, a boom 4 mounted for reciprocation in a lengthwise direction and driving connections between the motor and boom to reciprocate the boom and, by resulting reaction forces, produce oscillation of the power unit relative to the support.

The support or handle 1 is shown in the form of a generally rectangular frame formed of tubing to provide a structure which is relatively strong but of lightweight. A hand grip 6 projects forwardly and upwardly from the central portion of the rear end of the tubular frame at a selected angle so as to be grasped comfortably by the operator. A throttle control trigger 7 is pivotally mounted on the hand grip 6 and is connected to the throttle of the motor 3 by a flexible cable 8, e.g., a Bowden cable, so as to permit an operator to control the speed of the motor without removing his hand from the grip 6 while at the same time, permitting free oscillation of the power unit including the motor relative to the supporting handle.

To assist in supporting the apparatus during operation, a strap 10 extends across the rectangular frame 1 at a location approximately above the center of gravity of the entire apparatus including the boom and is provided at its center with an eye 11 adapted to receive a snaphook on a shoulder harness or strap worn by the operator.

The power unit 2 includes a frame or base 12 on which the motor 3 is mounted. The base 12 is suspended from the handle 1 by a parallelogram linkage system shown as comprising a pair of forward links 14 and a pair of rearward links 15. The two forward links 14 are located approximately opposite one another while the rearward links 15 are staggered as seen in FIGS. 1 and 2. The upper end portion of each link is bent inwardly at approximately right angles and extends through the respective side portion of the rectangular frame 1, being rotatably supported in the frame by a suitable bearing 16. The lower end of each of the links is similarly bent inwardly at approximately right angles and received in a suitable bearing 17 in the base 12. The linkage suspension system comprising rigid links 14 and 15 connected to the supporting frame 1 and base 12 by bearings having fixed axes permits oscillation of the power unit 2 in a direction parallel to the length of the frame while keeping it at a fixed distance from the frame, even though the frame is tilted in any direction. The operator thus has full control of the equipment despite the linkage suspension of the power unit.

The motor 3 is shown as being a single cylinder, 2-cycle gasoline engine having a high power-to-weight ratio. It is suitably secured on the base 12, e.g., by bolts 19. The open rectangular frame 1 and the supporting linkage 14, 15 provide free access to the engine including the fuel tank filler cap 21, the air filter retaining nut 22 and the starter handle 23.

The boom 4 preferably comprises a suitable length of aluminum tubing. At its upper end, the boom is provided with a suitable connector or clamp for attaching it to a tree limb which is to be shaken. A suitable connector is shown, e.g., in copending application of Richard Green et al., Ser. No. 641,241, now Patent No. 3,370,879 filed concurrently herewith. The lower end of the boom 4 is received in a driver tube 25 which is supported by bearings 26 in a forwardly extending portion 12a of the base 12 for reciprocation in a direction lengthwise of the boom. The boom 4 secured to the driver tube 25 by a bolt 27 which passes diametrically through aligned holes in the driver tube and the boom and by a clamp 28 surrounding a slotted forward end portion 25a of the driver tube. Moreover, an insert 30 fits snugly in the lower end portion of the boom and extends beyond the clamp 28. The bolt 27 passes through an aligned hole in the insert. The forward end of portion 30a of the insert is tapered and rounded as seen in FIG. 4 so as to avoid concentration of stress leading to early failure of the boom.

Rotation of the driver tube 26, and hence of the boom 4, relative to the base 12 is prevented by a torque rod 31 which is secured in a fitting 32 at the rearward end of the driver tube and extends parallel to the axis of the driver tube. The torque rod 31 is slidably received in a bearing 33 in the forward portion 12a of the base 12 so as to be reciprocable in a direction parallel to the axis of the boom. It will thus be seen that the driver tube 26 carrying the boom 4 and the torque rod 31 can reciprocate in a lengthwise direction but is held against rotation.

Driving connections between the motor 3 and the boom 4 comprise means for converting rotary motion of the motor to reciprocatory motion of the boom. As illustrated in the drawings, a crank shaft 35 is rotatably mounted by bearings 36 on the base 12. A crank 35a of the crank shaft is connected by a connecting rod 37 to a wrist pin 38 carried by the fitting 32 at the rearward end of the driver tube 26. A pulley 40 fixed on an outwardly projecting end of the crank shaft 35 is driven by a V-belt 41 from a driving pulley 42 on the motor. The pulleys and belt are enclosed by a cover 44. The driven pulley 40 is larger than the driving pulley 42 so as to provide a selected speed reduction. The driving pulley 42 is coupled to the motor by a centrifugal clutch 43. When the engine is running at idling speed, the centrifugal clutch 43 is disengaged so that the crank shaft 35 and the boom 4 are stationary relative to the base 12. When the speed of the engine, under control of the throttle control element 7 on the hand grip 6, is increased to a selected value, the centrifugal clutch engages to drive the crank shaft and thereby oscillate the driver tube 26 and boom 4 relative to the base 12 on which the engine is mounted.

By reason of the inertia of the boom assembly and the resistance of the tree limb to which the upper end of the boom is attached, reciprocation of the boom by the crank 35 results in reaction forces applied to the power unit comprising the base 12 and engine 3. However, since the power unit is freely suspended from the handle 1, the reaction forces are not transmitted to the handle. The boom is mounted on the base in such position that an extension of the longitudinal axis of the boom passes substantially through the center of gravity of the power unit. Since the line of action of the reaction force passes substantially through the center of gravity of the power unit, the force applied to reciprocate the boom and the reaction force on the power unit substantially balance one another so that the generation of couples or other secondary forces is avoided. Moreover, since the power unit is suspended from the handle by a parallelogram linkage, the direction of extension of the boom is not materially affected by oscillatory movement of the power unit relative to the handle. Hence, although the upper end of the boom is held at a relatively fixed height by reason of its attachment to the limb of a tree, oscillation of the boom and of the power unit does not result in forces tending to twist or rock the handle. The operator using the apparatus is hence not subjected to objectionable vibrational or periodic forces. His only effort is to support the part of the weight of the unit not carried on the tree limb and this effort is preferably eased by the light weight of the unit and by a shoulder harness attached to the eye 11 on the strap 10 extending across the handle frame.

While the power unit is freely oscillatable relative to the handle 1, means is preferably provided for limiting the amplitude of oscillation and for positioning the power unit relative to the handle when the boom is stationary and is inclined upwardly for attachment to a tree limb. The means for limiting movement of the power unit relative to the handle is shown as comprising bumper units 45 applied to each of the two front hanger links 14. Each of the bumper units is shown as comprising cylindrical bumper elements 46 and 47 (FIG. 5) and a tie strap 48. The rear bumper element 46 has an axial hole and may be made of any suitable material such as metal, plastic or rubber. The forward bumper element 47 is of a suitable rubber composition to provide a cushioning action. Metal plates 50 bonded to opposite ends of the bumper element 47 have projecting threaded studs 51. A bolt 52 extends through hole in the tie strap and through the rear bumper element 46, and is screwed into a tapped hole in the base extension 12a. One of the threaded studs 51 on the forward bumper element 47 is screwed into a tapped hole in the base extension 12a while the other extends through a hole in the tie strap 48 and receives a nut 53.

In operation, the apparatus is hand-held by the operator, one hand ordinarily grasping the hand grip 6 and the other hand grasping a forward portion of the frame 1. With the engine idling and the boom hence stationary relative to the power unit, the apparatus is manipulated by the operator so as to engage a clamp or connector on the upper end of the boom with the limb of a tree which it is desired to shake. For this purpose, it is ordinarily necessary to tilt the apparatus so that the boom is inclined upwardly. When the apparatus is thus tilted, the power unit tends to swing downwardly and toward the left as viewed in FIG. 1. However, any such movement of the power unit relative to the handle frame 1 is limited by engagement of the bumper elements 47 with the front hangers 14. The power unit is thereby positioned relative to the handle so that the operator can readily maneuver the boom so as to engage the clamp or connector at the upper end of the boom with the desired tree limb. The operator, with one finger, then presses the throttle control trigger 7 to increase the speed of the engine. When the speed increases to a selected value, the centrifugal clutch 43 engages to connect the driving pulley 42 with the engine and thereby drive the crank shaft 35 to reciprocate the boom 4 and thereby shake the tree limb to which the upper end of the boom is attached. When the shaking has continued for the desired length of time, the operator releases the throttle control trigger 7 whereupon the engine resumes idling speed and the centrifugal clutch 43 disengages. The operator thus has effective control of the apparatus and can shake the limb either to remove all of the fruit as in harvesting or to shake off only a portion of the fruit as for thinning.

The length of stroke and speed of reciprocation of the boom is selected in accordance with the use for which the apparatus is intended. For harvesting cherries, it has been found that a stroke of about 1½" to 2" and a speed of the order of 1,000 strokes per minute produce satisfactory results. For harvesting grapes and citrus fruit, it has been found that a longer stroke is desirable. The length of stroke may be varied as desired by changing the throw of the crank shaft 35 while the speed of reciprocation is controlled by engine speed and by the speed ratio provided by the respective diameters of the driving and driven pulleys.

While a preferred embodiment of the invention has been illustrated in the drawings and is herein particularly described, it will be understood that the invention is in no way limited to details of construction and that modifications of the apparatus may be made as desired within the scope of the appended claims.

What we claim is:

1. Fruit harvester comprising handle means for holding said harvester manually, a power unit supported by said handle means for oscillating movement relative thereto, a boom extending from said power unit and mounted for oscillatory movement in a generally lengthwise direction relative to said power unit, said power unit comprising a motor and drive means between said motor and said boom to oscillate said boom in a generally lengthwise direction relative to said power unit and thereby oscillate said power unit by reaction forces, the longitudinal axis of said boom passing approximately through the center of gravity of said power unit so that reaction forces of said boom and power unit are substantially colinear.

2. Fruit harvester according to claim 1, in which said handle means comprises a generally rectangular tubular frame.

3. Fruit harvester according to claim 2, in which said handle means further comprises a hand grip carried by said frame.

4. Fruit harvester according to claim 2, in which said power unit is suspended from said frame by a plurality of links providing a parallelogram movement.

5. Fruit harvester according to claim 1, in which said motor is an internal combustion engine having a throttle and in which said handle means comprises a hand grip, further comprising a throttle control element associated with said hand grip and means connecting said throttle control element with said throttle.

6. Fruit harvester according to claim 1, in which said power unit is suspended from said supporting means by linkage providing parallelogram movement.

7. Fruit harvester according to claim 6, further comprising means cooperating with said linkage for limiting the amplitude of oscillatory movement of said power unit relative to said supporting means.

8. Fruit harvester according to claim 1, further comprising means for restraining rotation of said boom relative to said power unit.

9. Fruit harvester according to claim 1, in which said boom is tubular, further comprising an insert fitting in an end portion of said boom adjacent said power unit, said insert having a tapered and rounded inner end portion.

10. Fruit harvester comprising handle means comprising a generally rectangular tubular frame, a power unit comprising a motor, parallelogram linkage suspending said power unit from said handle means for oscillatory movement relative thereto, a boom extending from said power unit and mounted for generally lengthwise oscillatory movement relative to said power unit, drive means driven by said motor to oscillate said boom relative to said power unit, said motor having a throttle, a throttle control element associated with said handle means and means connecting said throttle control element with said throttle.

11. Fruit harvester according to claim 10, in which said drive means includes speed responsive clutch means for transmitting power to oscillate said boom only when said motor attains a selected speed.

References Cited

UNITED STATES PATENTS

| | | | |
|---|---|---|---|
| 1,626,068 | 4/1927 | Bartlett | 56—328 |
| 3,101,583 | 8/1963 | Ferguson | 56—328 |
| 3,132,458 | 5/1964 | Russell et al. | 56—328 |
| 3,174,269 | 3/1965 | Londo | 56—328 |
| 3,212,250 | 10/1965 | Aulabaugh | 56—328 |

JAMES A. LEPPINK, Primary Examiner

U.S. Cl. X.R.

56—328

UNITED STATES PATENT OFFICE
Certificate

Patent No. 3,459,269            Patented August 5, 1969

Thomas A. Hunter, Noble P. Sherwood, Gilbert E. Buske, and Alexander J. Guarino

Application having been made by Thomas A. Hunter, Noble P. Sherwood, Gilbert E. Buske, and Alexander J. Guarino, the inventors named in the patent above identified, and Textron Inc., a corporation of Delaware, the assignee, for the issuance of a certificate under the provisions of Title 35, Section 256, of the United States Code, adding the name of Richard F. Green as a joint inventor, and a showing and proof of facts satisfying the requirements of the said section having been submitted, it is this 10th day of August, 1971, certified that the name of the said Richard F. Green is hereby added to the said patent as a joint inventor with the said Thomas A. Hunter, Noble P. Sherwood, Gilbert E. Buske, and Alexander J. Guarino.

FRED W. SHERLING
                                                                    *Associate Solicitor.*